United States Patent
Akatsuka

(10) Patent No.: US 8,676,505 B2
(45) Date of Patent: Mar. 18, 2014

(54) POSITIONING SYSTEM, COMMUNICATION DEVICE, POSITIONING METHOD

(75) Inventor: Mitsuru Akatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 13/170,396

(22) Filed: Jun. 28, 2011

(65) Prior Publication Data

US 2012/0010778 A1 Jan. 12, 2012

(30) Foreign Application Priority Data

Jul. 6, 2010 (JP) .................................. 2010-153906

(51) Int. Cl.
*G01C 21/10* (2006.01)

(52) U.S. Cl.
USPC .......................................... 701/527; 701/472

(58) Field of Classification Search
USPC .................... 701/527, 145, 32.3; 702/145; 342/357.3, 357.58

See application file for complete search history.

(56) References Cited

U.S. PATENT DOCUMENTS

| | | | |
|---|---|---|---|
| 7,584,030 B1* | 9/2009 | Graham | 701/33.3 |
| 7,711,483 B2* | 5/2010 | Colley | 701/472 |
| 7,756,639 B2* | 7/2010 | Colley et al. | 701/446 |
| 2005/0134503 A1* | 6/2005 | Colley et al. | 342/357.09 |
| 2008/0143595 A1* | 6/2008 | Colley et al. | 342/357.12 |
| 2008/0147686 A1* | 6/2008 | Colley et al. | 707/100 |
| 2009/0234582 A1 | 9/2009 | Figueroa | |
| 2010/0076681 A1* | 3/2010 | Colley | 701/213 |
| 2010/0309042 A1 | 12/2010 | Colley et al. | |

FOREIGN PATENT DOCUMENTS

FR 2 931 285 11/2009

OTHER PUBLICATIONS

Extended Search Report issued Oct. 20, 2011 in European Application No. 11168817.2.

* cited by examiner

*Primary Examiner* — Khoi Tran
*Assistant Examiner* — Robert Nguyen
(74) *Attorney, Agent, or Firm* — Oblon, Spivak, McClelland, Maier & Neustadt, L.L.P.

(57) ABSTRACT

There is provided a positioning system including a communication device which includes a connector configured to engage with a connector provided to a vehicle, a vehicle communication section configured to receive vehicle speed information or travelling distance information of the vehicle from the vehicle via the connector, and an information processing device-communication section configured to transmit, to an information processing device, transmission information based on the vehicle speed information or the travelling distance information acquired by the vehicle communication section, and the information processing device which includes a communication section configured to receive the transmission information from the communication device, and a position calculation section configured to calculate a current position based on the vehicle speed information or the travelling distance information.

9 Claims, 13 Drawing Sheets

FIG. 8

| | FIXED-NAVIGATION DEVICE 900 | PND800a | PND800b | PND200a | PND200b | PND200c |
|---|---|---|---|---|---|---|
| EASINESS OF ATTACHMENT | × | ◎ | ◎ | ○ | ○ | ○ |
| AUTONOMOUS ACCURACY | ○ | — | △ | ○ | ○ | ○ |
| GPS DISTURBANCE SUPPRESSION | ○ | × | ○ | ○ | ○ | ○ |
| POSITIONING CONTINUATION INSIDE TUNNEL, ETC. | ○ | × | △ | ○ | ○ | ○ |
| POSITIONING IMMEDIATELY AFTER POWER IS TURNED ON | ◎ | × | × | × | ○ | ◎ |

FIG. 12
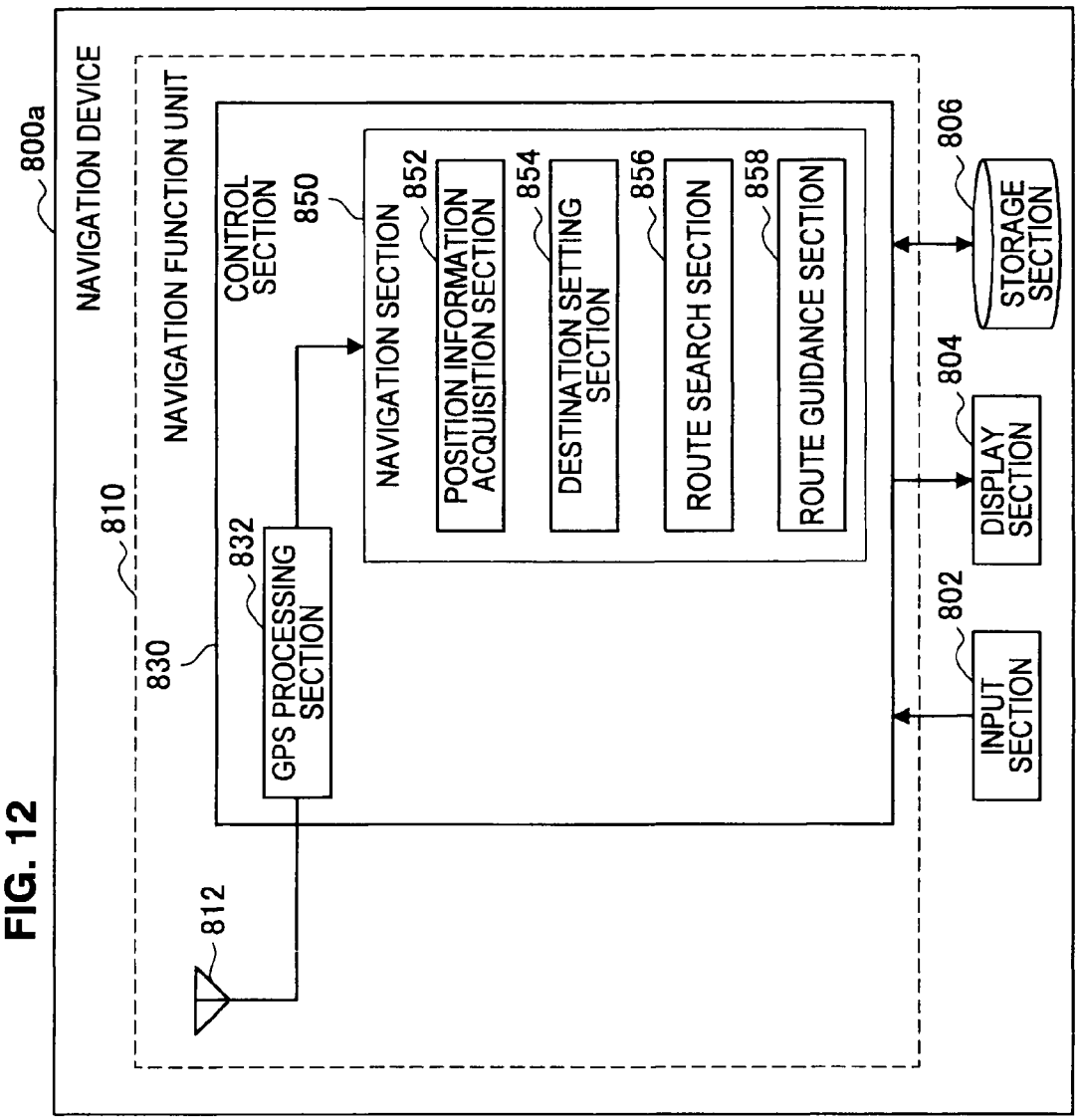
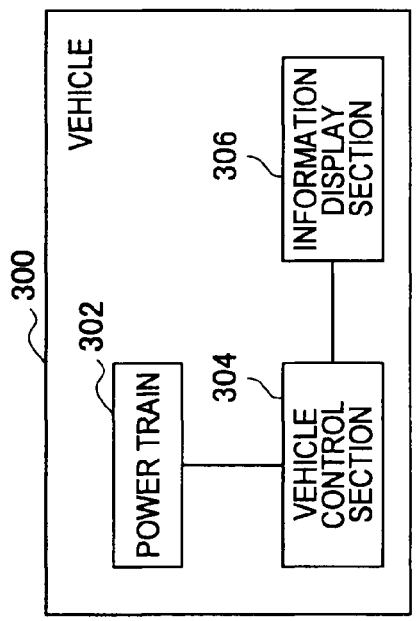

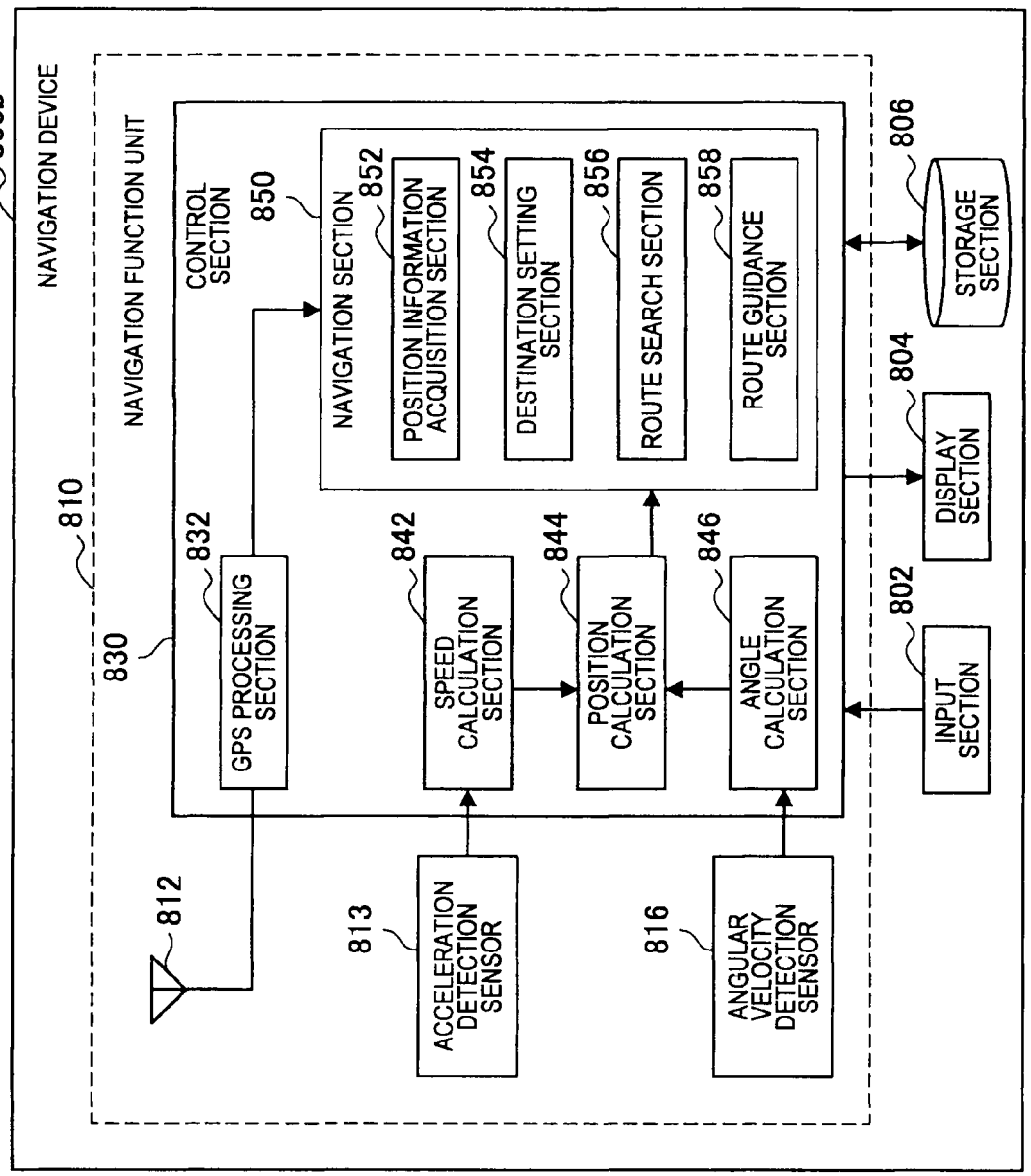
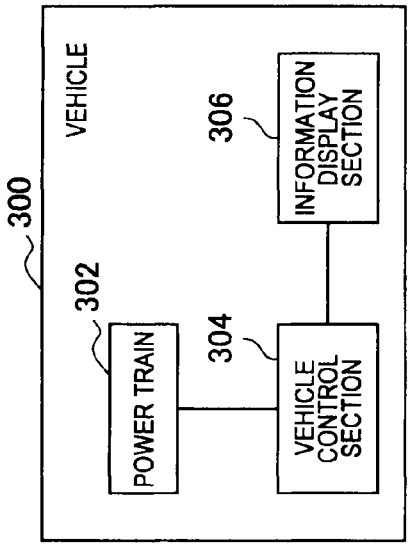
FIG. 13

POSITIONING SYSTEM, COMMUNICATION DEVICE, POSITIONING METHOD

BACKGROUND

The present disclosure relates a positioning system, a communication device, and a positioning method.

In recent years, navigation devices have been in widespread use, each of which shows a route from a current position to a destination based on position information acquired by a GPS (Global Positioning System) and the like. Of those, most of car navigation devices mounted on vehicles were each used by being fixed to the vehicle (hereinafter, referred to as fixed-navigation device). On the other hand, there have recently appeared navigation devices that can be attached and detached easily, and can be carried around (hereinafter, referred to as PND (Personal Navigation Device)).

In addition, with improvements in electronics technology, many of the functions that the navigation device provides become realizable by using a compact electronic component. Accompanied therewith, the function that the navigation device provides becomes realizable as a function of a portable device such as a mobile phone and a smartphone.

Among navigation devices, there is a navigation device that can provide position information to even a place not reached by a radio wave of the GPS by autonomous navigation using, in addition to absolute position information using the GPS, information of a relative position based on speed information, angular velocity information, and the like which are acquired from a sensor and the like (for example, JP 2010-078595A).

SUMMARY

However, there was an issue that there were many portable navigation devices, such as a PND, which did not have an autonomous navigation function, and, even if a portable navigation device did have the autonomous navigation function, an accuracy of the autonomous navigation of the portable navigation device was lower compared with an accuracy of the autonomous navigation of a fixed-navigation device. In light of the foregoing, it is desirable to provide a navigation system, a vehicle information communication device, and a navigation method, which are novel and improved, and which are capable of enhancing the accuracy of position information obtained by the autonomous navigation of an information processing device such as a portable navigation device when mounted on a vehicle.

According to an embodiment of the present disclosure, there is provided a positioning system which includes a communication device including a connector configured to engage with a connector provided to a vehicle, a vehicle communication section configured to receive vehicle speed information or travelling distance information of the vehicle from the vehicle via the connector, and an information processing device-communication section configured to transmit, to an information processing device, transmission information based on the vehicle speed information or the travelling distance information acquired by the vehicle communication section, and the information processing device including a communication section configured to receive the transmission information from the communication device, and a position calculation section configured to calculate a current position based on the vehicle speed information or the travelling distance information.

According to such a configuration, the communication device which is set by being engaged with the connector of the vehicle can acquire the vehicle speed information or the travelling distance information from the vehicle. Then, the communication device transmits the transmission information based on the acquired vehicle speed information or travelling distance information to the information processing device. The information processing device which has received the transmission information transmitted from the communication device can calculate the current position based on the vehicle speed information or the travelling distance information included in the transmission information. Here, the accuracy of the vehicle speed information or the travelling distance information acquired from the vehicle is higher than the accuracy of speed information of the vehicle indirectly acquired by an acceleration sensor. Accordingly, the positioning system can calculate position information having higher accuracy than that of information of a relative position based on a detection value of the sensor.

The information processing device may further include a navigation section configured to show a route to a destination using the calculated position information.

The connector provided to the vehicle may be a connector for fault diagnosis.

The communication device may further include an angular velocity detection sensor configured to acquire an angular velocity of the vehicle. The information processing device-communication section may transmit, as the transmission information to the information processing device, the angular velocity acquired by the angular velocity detection sensor and the vehicle speed information or the travelling distance information.

The communication device may have a shape such that the connector is fixed on the connector provided to the vehicle when the connector engages with the connector provided to the vehicle.

According to an embodiment of the present disclosure, there is provided a communication device which includes a connector configured to engage with a connector provided to a vehicle, a vehicle communication section configured to receive vehicle speed information or travelling distance information of the vehicle from the vehicle via the connector, and an information processing device-communication section configured to transmit, to an information processing device, transmission information based on the vehicle speed information or the travelling distance information acquired by the vehicle communication section.

The communication device may further include an angular velocity detection sensor configured to acquire an angular velocity of the vehicle.

The information processing device-communication section may transmit, as the transmission information to the information processing device, the angular velocity acquired by the angular velocity detection sensor and the vehicle speed information or the travelling distance information.

The communication device may further include a position calculation section configured to calculate a current position based on the angular velocity acquired by the angular velocity detection sensor and the vehicle speed information or the travelling distance information. The information processing device-communication section may transmit the position information as the transmission information to the information processing device.

The information processing device-communication section may communicate wirelessly with the information processing device in accordance with a short range wireless communication standard.

According to another embodiment of the present disclosure, there is provided a positioning method of a positioning system which includes a communication device that is provided inside a vehicle by a connector being engaged with a connector provided to the vehicle and that includes a vehicle communication section and an information processing device-communication section, and which includes an information processing device that includes a communication section configured to communicate with the information processing device-communication section and a position calculation section configured to calculate a current position, the positioning method including receiving, by the vehicle communication section, vehicle speed information or travelling distance information of the vehicle from the vehicle via the connector, transmitting, by the information processing device-communication section, transmission information based on the vehicle speed information or the travelling distance information acquired by the vehicle communication section, to the information processing device, receiving, by the communication section, the transmission information, and calculating, by the position calculation section, the current position based on the vehicle speed information or the travelling distance information.

According to the embodiments of the present disclosure described above, it is possible to enhance the accuracy of position information obtained by the autonomous navigation of a portable positioning device when mounted on a vehicle.

BRIEF DESCRIPTION OF THE DRAWINGS

FIG. 8 is a table of a comparison of respective navigation systems;

FIG. 12 is a configuration diagram of a PND (without autonomous navigation function) of the past; and FIG. 13 is a configuration diagram of a PND (with autonomous navigation function) of the past.

DETAILED DESCRIPTION OF THE EMBODIMENT(S)

Figure 1:
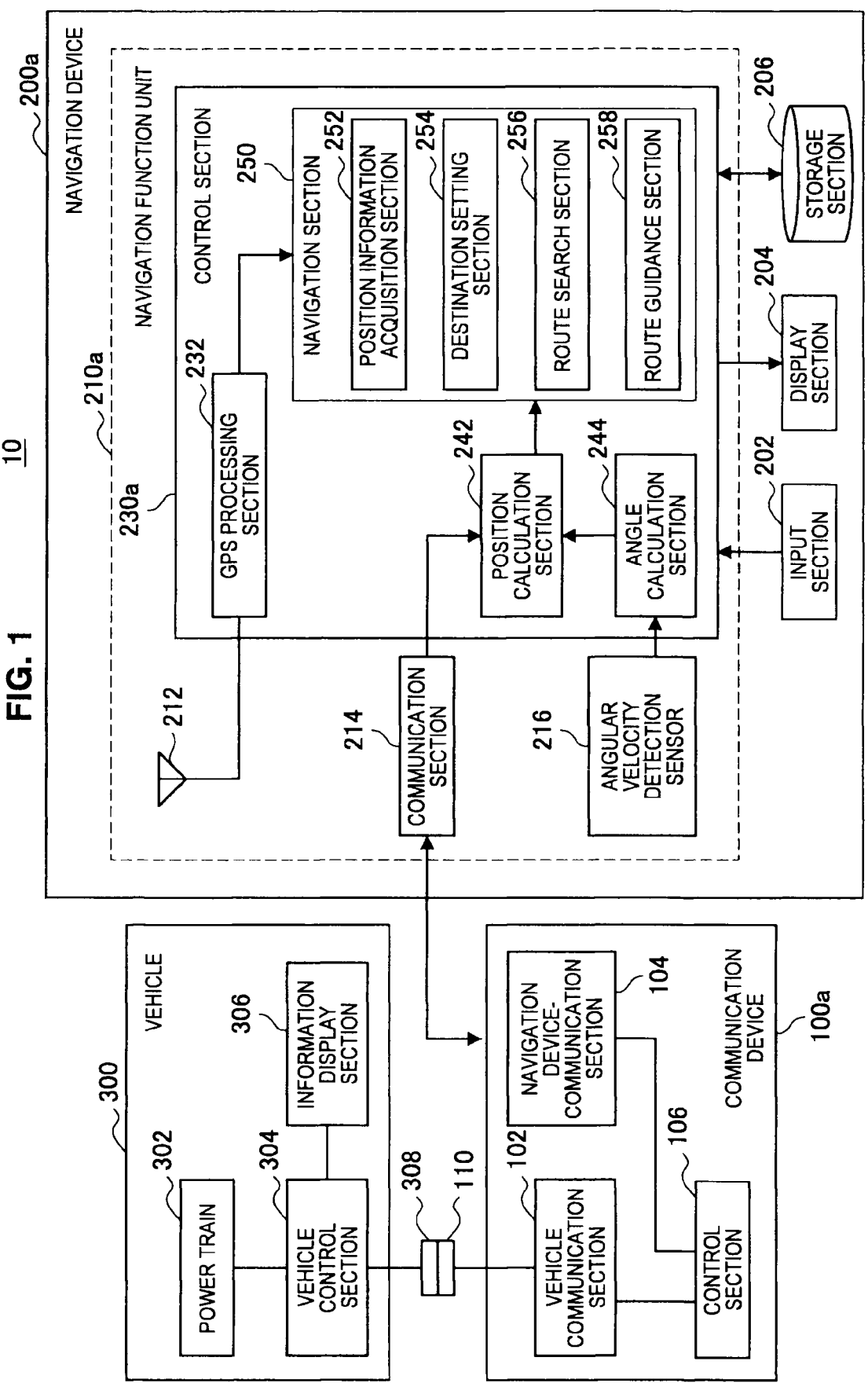
FIG. 1 is a configuration diagram of a navigation system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets after the same reference numerals. For example, multiple structures that have substantially the same function and structure are distinguished from one another like navigation device 200a and navigation device 200b, as necessary. Note that, in the case where it is not particularly necessary to distinguish the multiple structural elements that have substantially the same function and structure from one another, the multiple structural elements are denoted with the same reference numeral only. For example, in the case where it is not particularly necessary to distinguish the navigation device 200a from the navigation device 200b, they are each simply referred to as navigation device 200.

Note that the description will be given in the following order.

Figure 11:
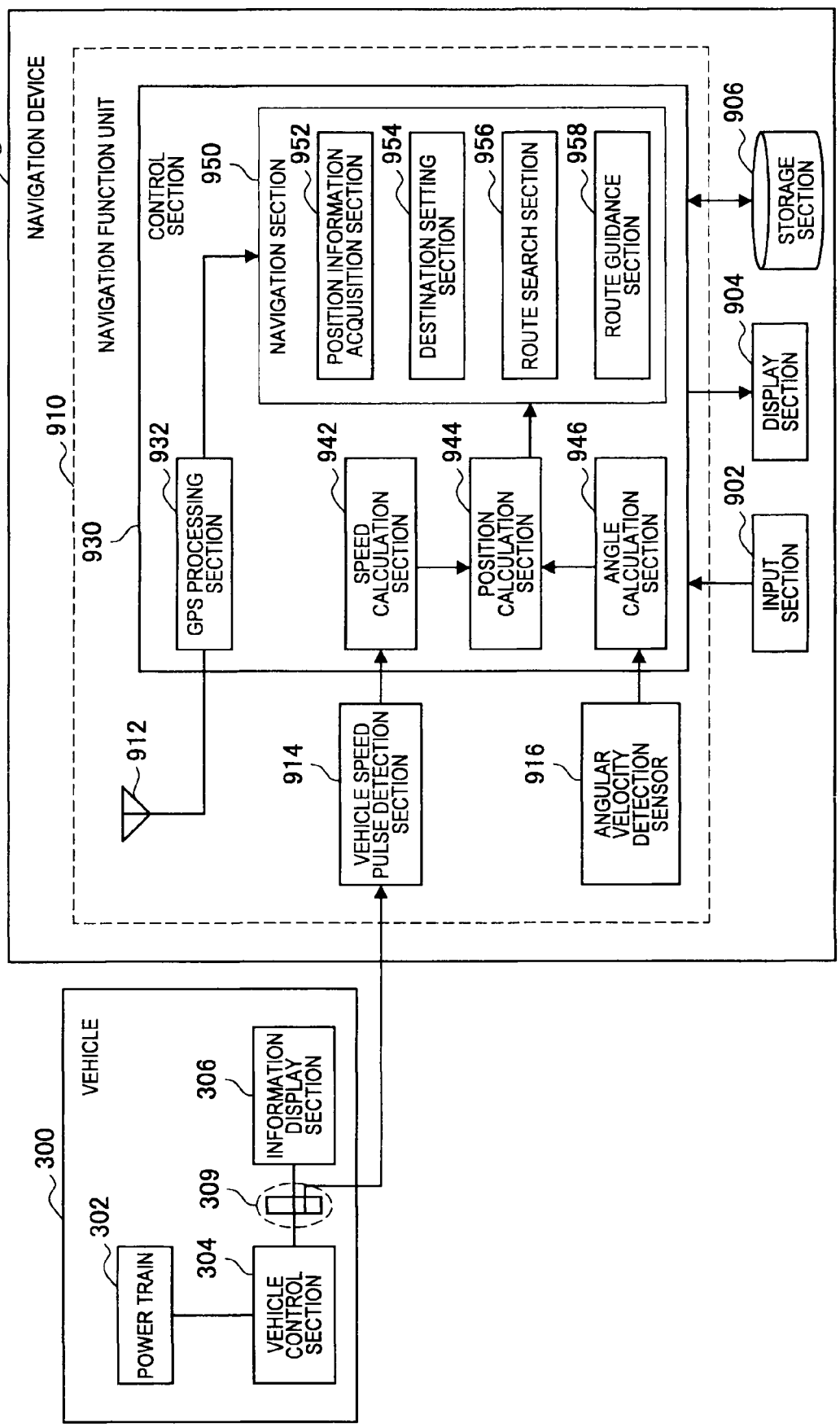
FIG. 11 is a configuration diagram of a fixed-navigation device of the past.

1. Outline
2. First embodiment (example where communication device acquires and transmits vehicle speed information and the like)
3. Second embodiment (example where communication device includes angular velocity detection sensor)
4. Third embodiment (example where communication device calculates relative position)
5. Performance comparison
6. Modified example 1. Outline Configuration of Navigation Device of the Past First, in order to describe a background in achieving the present disclosure, there will be described navigation devices of the past shown in FIGS. 11 to 13, respectively. FIG. 11 is a configuration diagram of a fixed type navigation device of the past which is used by being fixed to a vehicle. FIG. 12 is a configuration diagram of a PND of the past, which is a portable navigation device (PND) and does not have an autonomous navigation function. FIG. 13 is a configuration diagram of a PND of the past which has an autonomous navigation function.

Note that, hereinafter, although the description will be made taking as an example a case of a navigation device, the present disclosure is not limited to such an example. The present disclosure is applicable to all information processing devices each using position information.

(Fixed-Navigation Device 900)

First, referring to FIG. 11, a fixed type navigation device 900 of the past (hereinafter, referred to as fixed-navigation device 900) is a navigation device used by being fixed and mounted on a vehicle 300, and mainly includes a GPS antenna 912, a vehicle speed pulse detection section 914, an angular velocity detection sensor 916, an input section 902, a display section 904, a storage section 906, a GPS processing section 932, a speed calculation section 942, a position calculation section 944, an angle calculation section 946, and a navigation section 950.

By the way, the fixed-navigation device 900 can also acquire position information by autonomous navigation in addition to the position information acquired by the positioning using the GPS. For the positioning using the autonomous navigation, information indicating a travelling azimuth and a travelling distance of a vehicle is necessary. Accordingly, the autonomous navigation positioning generally uses information of speed of the vehicle 300 (hereinafter, referred to as vehicle speed information) and information of an angle calculated from an angular velocity acquired by the angular velocity detection sensor 916. Here, the fixed-navigation device 900 performs the positioning by the autonomous navigation using vehicle speed information calculated from a vehicle speed pulse signal acquired from the vehicle 300. Note that the vehicle speed pulse signal used here is a signal corresponding to rotation speed of a wheel of the vehicle 300, and there can be obtained relatively accurate vehicle speed information.

The fixed-navigation device 900 acquires the vehicle speed pulse signal to be used in the vehicle 300 via a branch wire using a caulking metal 309, for example. Since there is necessitated wiring for acquiring the vehicle speed pulse signal, special knowledge is necessary for the attachment of the fixed-navigation device 900. Accordingly, the attachment of the fixed-navigation device 900 is generally performed by a person who has the special knowledge at a store that sells the fixed-navigation device 900, and once attached, the fixed-navigation device 900 is used as it is, as fixed.

(PND 800a: without Autonomous Navigation Function)

Next, referring to FIG. 12, a portable navigation device 800a of the past (hereinafter, referred to as PND 800a) is obtained by improving the fixed-navigation device 900 such that the fixed-navigation device 900 can be easily attached and can also be carried around and used.

In order to be portable, the PND 800a does not have a positioning function using the autonomous navigation. The navigation section 850 performs the navigation using position information based on GPS positioning information calculated from a GPS reception signal. Since the wiring for acquiring the vehicle speed pulse signal is unnecessary, the PND 800a can be easily attached and detached.

Figure 2:
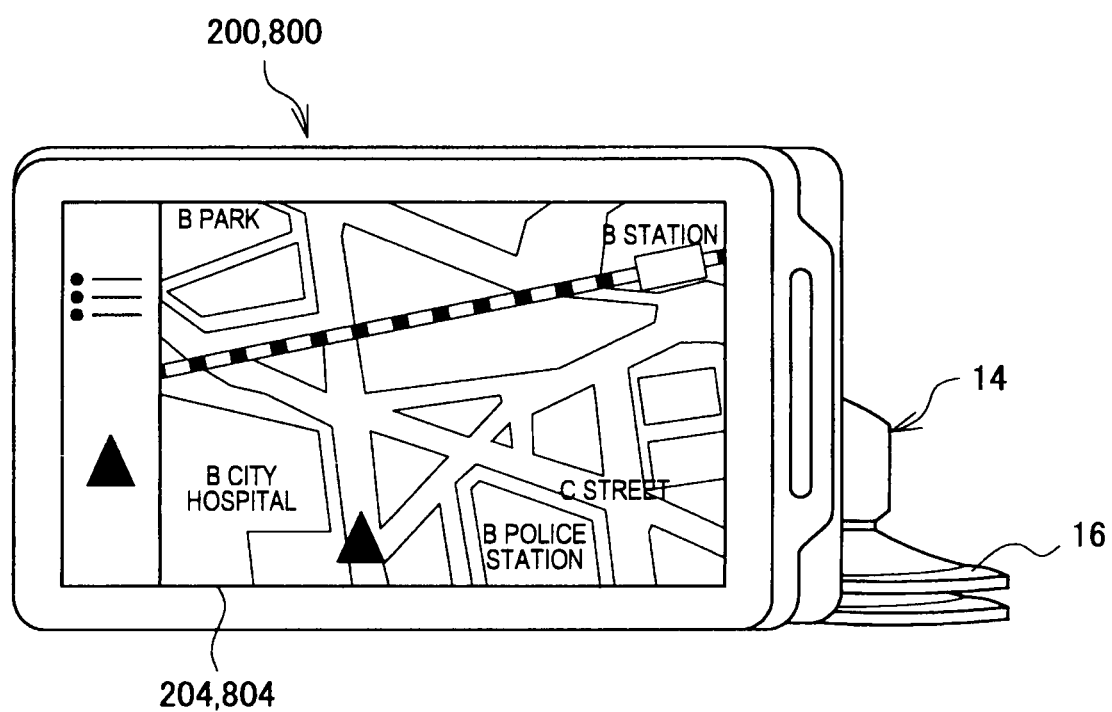
FIG. 2 is an appearance example of a navigation device (PND) according to the first embodiment.

For example, as shown in FIG. 2, the PND 800a is held by a cradle 14 which is attached to a dashboard of the vehicle 300 via a suction cup 16 and is mechanically and electrically connected to the cradle 14. Since the PND 800a can be easily attached to and detached from the cradle 14, a user can detach the PND 800a and use the PND 800a also for walking.

However, since the PND 800a does not have the positioning function using the autonomous navigation, it is difficult to acquire position information at a place where it is difficult to receive a GPS signal. Accordingly, it is difficult for the PND 800a to continue the positioning inside a tunnel. Further, it generally requires some time to receive the GPS signal after activating the navigation device. Accordingly, it is difficult for the PND 800a to perform the positioning immediately after the activation. For example, in order that the fixed-navigation device 900 compensates for the defect, the fixed-navigation device 900 is configured in a manner to be able to perform the positioning even at immediately after the activation by using the positioning using the autonomous navigation.

In recent years, although there has appeared a mobile phone that can be used as a car navigation device, when the mobile phone does not have the positioning function using the autonomous navigation, the mobile phone also has the same issue as the PND 800a.

(PND 800b: with Autonomous Navigation Function)

As described above, the PND 800a in which the positioning function using the autonomous navigation is omitted in order to simply facilitate the attachment is remarkably inferior in the accuracy of current position information. A PND 800b, which achieves both the autonomous navigation function and the easiness of attachment, is developed for compensating for the defect.

Referring to FIG. 13, the PND 800b includes, in addition to the configuration of the PND 800a, an acceleration detection sensor 813, an angular velocity detection sensor 816, a speed calculation section 842, a position calculation section 844, and an angle calculation section 846. Compared to the fixed-navigation device 900, the PND 800b differs in having the acceleration detection sensor 813 in place of the vehicle speed pulse detection section 914.

With such a configuration, there can be acquired vehicle speed information from a detection value obtained by a sensor in place of the vehicle speed pulse signal. Accordingly, the PND 800b can realize the positioning function using the autonomous navigation by using the vehicle speed information. In addition, when the acceleration is detected using the sensor, the wiring between the PND 800b and the vehicle 300 is unnecessary, and hence, the PND 800b can be easily attached and detached.

As described above, the PND 800 that has so far been provided has been improved such that the PND 800 can be easily attached and detached, and also can provide a function equivalent to the function of the fixed type navigation device by performing the positioning by the autonomous navigation using a sensor.

Nevertheless, however, there is a point that the portable navigation device is inferior to the fixed type navigation device in navigation accuracy. The PND 800b calculates vehicle speed from detection information of the acceleration detection sensor 813 and uses the vehicle speed for the autonomous navigation. However, the vehicle speed information calculated from acceleration information detected by the sensor is inferior in accuracy compared to that of the vehicle speed information based on a vehicle speed pulse. Consequently, particularly in the case where a state in which a GPS signal is not received continues for a long time, positioning errors accumulate, and it is difficult to retain the positioning accuracy.

In consequence of this, for the PNDs according to the first to third embodiments of the present application which will be described below, there is considered that vehicle speed information which can be acquired via an OBD-II connector is used for the positioning using the autonomous navigation. The OBD-II connector is a connector used for connecting an on-board diagnostic system called OBD-II (On-Board Diagnosis) with a vehicle, and the OBD-II connector is also called a fault diagnosis connector or a vehicle diagnosis connector.

2. First Embodiment

Figure 3:
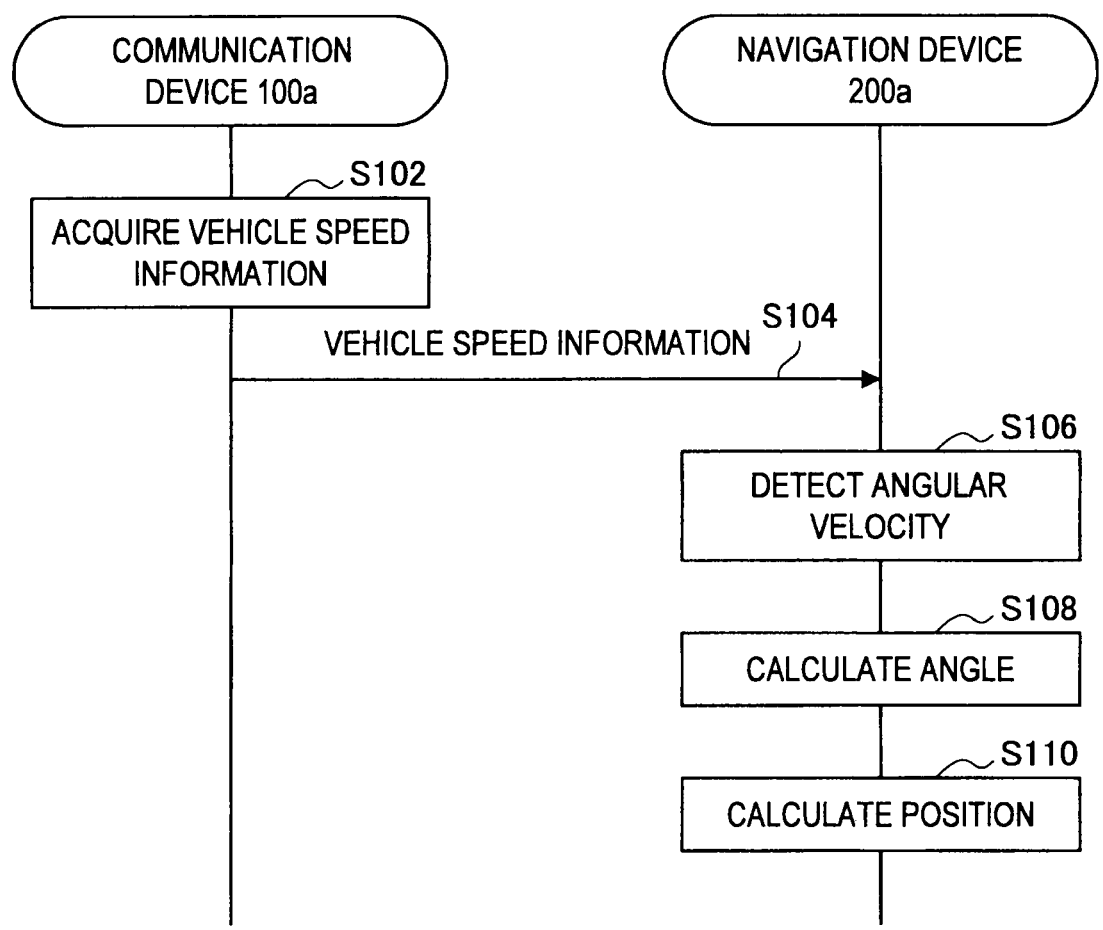
FIG. 3 is a sequence diagram showing positioning operation using autonomous navigation of the navigation system according to the first embodiment.

Example where Communication Device Acquires and Transmits Vehicle Speed Information and the Like Functional Configuration Here, with reference to FIGS. 1 to 3, there will be described a navigation system according to a first embodiment of the present disclosure. FIG. 1 is a configuration diagram of a navigation system 10 according to the first embodiment.

The navigation system 10 according to the first embodiment includes a communication device 100a which has a connector 110 that engages with a fault diagnosis connector of a vehicle 300, and a navigation device 200a which is portable.

(Vehicle 300)

The vehicle 300 mainly includes a power train 302, an information display section 306, and a vehicle control section 304, and is equipped with a connector 308 for fault diagnosis. The connector 308 is the OBD-II connector described above. It is required by law that a new vehicle is equipped with the OBD-II from 1996 in the US and from 2006 in Japan, and hence, all the new vehicles currently on sale in the US and Japan are each equipped with the OBD-II.

The communication device 100a mainly includes the connector 110 configured to engage with the connector 308 of the vehicle 300, a vehicle communication section 102 configured to communicate with the vehicle 300 via the connector 110, a navigation device-communication section 104 configured to communicate with the navigation device 200a, and a control section 106 configured to control entire movement of the communication device 100a.

The connector 110 is a fault diagnosis connector that is called the OBD-II connector described above. The connector 308 of the vehicle 300 side has a pin alignment corresponding to the connector 110 in order to engage with the connector 110.

(Communication Device 100a)

The communication device 100a has a shape such that the connector 110 is fixed on the connector 308 of the vehicle 300 when the connector 110 engages with the connector 308 of the vehicle 300. For example, in the case where two objects are connected to each other via a cable, the positional relationship between the two objects alters owing to the change in the shape of the cable. On the other hand, however, since the connector 110 of the communication device 100a is formed in an integrated manner with a casing of the communication device 100a, the positional relationship between the casing of the communication device 100a and a casing of the vehicle 300 is not altered and is in a fixed state.

The vehicle communication section 102 communicates with the vehicle 300 via the connector 110, and receives vehicle speed information or travelling distance information of the vehicle 300. In the present embodiment, hereinafter, there will be described an embodiment in which the vehicle speed information of the vehicle 300 is received. In accordance with the control of the control section 106, the vehicle communication section 102 regularly transmits an acquisition request for acquiring the vehicle speed information to the vehicle 300, and receives the vehicle speed information transmitted from the vehicle 300.

The navigation device-communication section 104 communicates with the navigation device 200a, and has a function of an information processing device-communication section which transmits, to the navigation device 200a, transmission information based on the vehicle speed information acquired by the vehicle communication section 102. In the present embodiment, the transmission information is the vehicle speed information itself The navigation device-communication section 104 may transmit the transmission information using radio communication. For example, the navigation device-communication section 104 can perform communication in accordance with a standard of short range wireless communication such as Bluetooth (registered trademark).

The control section 106 controls entire operation of the communication device 100a. The control section 106 periodically acquires information from the vehicle 300 by controlling the vehicle communication section 102, for example. Further, the control section 106 transmits the vehicle speed information acquired via the connector 110 to the navigation device 200a by controlling the navigation device-communication section 104.

(Navigation Device 200a)

The navigation device 200a (hereinafter, referred to as PND 200a) according to the first embodiment of the present disclosure represents a PND having an external appearance as shown in FIG. 2, for example. FIG. 2 is an external view of the navigation device (PND) 200 according to the first to third embodiments of the present disclosure. Further, since a PND 800 of the past also has the same external appearance, FIG. 2 is also an external view of the PND 800 of the past.

The PND 200a is a portable navigation device which has functions of showing a route to a destination and providing a user with various pieces of information each associated with position information. The PND 200a has a display section 204, and is held by a cradle 14 which is attached to a dashboard of a vehicle 300 via a suction cup 16. The PND 200 can be easily attached to and also detached from the cradle 14.

The PND 200a has a function of acquiring a current position, and also stores map data. Therefore, the PND 200a can display on the display section 204 the information of the current position in a superimposed manner on a map.

Referring to FIG. 1 again, the PND 200a mainly includes an input section 202, a display section 204, a storage section 206, and a navigation function unit 210a.

The input section 202 accepts an operation instruction from the user, and outputs the operation contents to the navigation function unit 210a. Examples of the operation instruction input by the user include setting a destination, enlarging/reducing the scale of a map, setting a vocal guidance, and setting a screen display.

Further, the input section 202 may be a touch screen which is provided in an integrated manner with the display section 204. Alternatively, the input section 202 may have a physical configuration such as a button, a switch, and a lever, which is provided separately from the display section 204. Further, the input section 202 may be a signal reception section which detects a signal indicating an operation instruction by the user transmitted from a remote controller.

The display section 204 is a display device which outputs a screen in which information indicating a current position is superimposed on map data. The display section 204 may be a display device such as an LCD (Liquid Crystal Display) and an organic EL (Electroluminescence) display.

The storage section 206 is a storage medium which stores a program for the PND 200a to operate and map data. Note that the storage section 206 may be, for example, a storage medium such as a non-volatile memory such as a Flash ROM (or Flash Memory), an EEPROM (Electrically Erasable Programmable Read-Only Memory), and an EPROM (Erasable Programmable ROM), a magnetic disk such as a hard disk and a disc-like magnetic disk, an optical disk such as a CD (Compact Disc), a DVD-R (Digital Versatile Disc Recordable), and a BD (Blu-Ray Disc (registered trademark)), and an MO (Magneto Optical) disk.

Further, the navigation function unit 210a is a configuration for realizing a navigation function, and mainly includes a GPS antenna 212, a communication section 214, an angular velocity detection sensor 216, and a control section 230a. The control section 230a includes arithmetic processing means such as a CPU (Central Processing Unit). In addition, the control section 230a mainly includes a GPS processing section 232, a position calculation section 242, an angle calculation section 244, and functions of a navigation section 250.

The GPS antenna 212 is capable of receiving GPS signals from multiple GPS satellites, and inputs the received GPS signals to the GPS processing section 232. Note that the GPS signals received here include orbital data indicating orbits of the GPS satellites and information such as transmission time of the signals.

The GPS processing section 232 calculates position information indicating the current position of the PND 200a based on the multiple GPS signals input from the GPS antenna 212, and supplies the navigation section 250 with the calculated position information. Specifically, the GPS processing section 232 calculates a position of each of the GPS satellites from the orbital data obtained by demodulating each of the multiple GPS signals, and calculates a distance between each of the GPS satellites and the PND 200a from a difference between a transmission time and a reception time of the GPS signal. Then, based on the calculated positions of the respective GPS satellites and the distances from the respective GPS satellites to the PND 200a, a current three-dimensional position, which is absolute position information, is calculated.

In this way, the navigation section 250 is capable of executing navigation processing based on the position information supplied by the GPS processing section 232. However, in the case where it is difficult to receive the GPS signals from the GPS satellites, it may be impossible for the PND 200a to perform the positioning using the GPS. Consequently, the PND 200a is also capable of executing, mainly when it is difficult to receive the GPS signals, navigation processing by using relative position information obtained by the autonomous navigation.

Of the configuration of the PND 200a shown above, the communication section 214, the angular velocity detection sensor 216, the position calculation section 242, and the angle calculation section 244 are used for acquiring the relative position using the autonomous navigation.

The PND 800b of the past had, in place of the communication section 214, the acceleration detection sensor 813 and the speed calculation section 842 for calculating the vehicle speed information from the detection value of the acceleration detection sensor 813 (refer to FIG. 13). In place of the vehicle speed information acquired by using the acceleration detection sensor 813 and the speed calculation section 842 of the past, the PND 200a according to the first embodiment of the present disclosure attempts to acquire more accurate vehicle speed information, which can be obtained from the vehicle 300.

The communication section 214 has a function of communicating with an external device via wire or radio. The communication section 214 mainly has functions of a wired or wireless interface for being connected to an external device and a communication processing section configured from a circuit and the like for processing received information or information to be transmitted.

The communication section 214 has a function as a reception section which receives the transmission information transmitted from the communication device 100a by the control of the control section 230a. In the present embodiment, the transmission information is the vehicle speed information that the communication device 100a has acquired from the vehicle 300. The communication section 214 passes the received transmission information to the position calculation section 242.

Further, the angular velocity detection sensor 216 is a detection device for detecting an angular velocity. The angular velocity detection sensor 216 is a sensor having a function of detecting, as a voltage value, a yaw rate $\omega_z$ which is a variable velocity (angular velocity) of the rotation angle when the PND 200a is rotated. The angular velocity detection sensor 216 detects the yaw rate at a sampling frequency of 50 Hz, for example, and inputs data indicating the detected yaw rate to the angle calculation section 244.

The angle calculation section 244 calculates an angle θ of when the PND 200a is rotated by multiplying the yaw rate $\omega_z$ input from the angular velocity detection sensor 216 by a sampling frequency (here, for example, 0.02 s), and inputs angle data indicating the angle θ to the position calculation section 242.

The position calculation section 242 has a function of calculating relative position information of a current position based on the speed V indicated by the vehicle speed information input from the communication section 214 and the angle θ calculated by the angle calculation section 244. Specifically, the position calculation section 242 calculates an amount of change from the position at the last calculation to the current position based on the speed V and the angle θ. Then, the position calculation section 242 calculates current position information from the amount of change and the last position. After that, the position calculation section 242 supplies the navigation section 250 with the position information of the current position.

The navigation section 250 has a function of showing a route to a destination based on the relative position information calculated on the basis of the vehicle speed information acquired from the vehicle 300. The navigation section 250 mainly has functions of a position information acquisition section 252, a destination setting section 254, a route search section 256, and a route guidance section 258.

The position information acquisition section 252 acquires position information of the PND 200a. The position information acquisition section 252 may acquire the position information from either the GPS processing section 232 or the position calculation section 242. For example, when the GPS processing section 232 can calculate the position information, the position information acquisition section 252 acquires the absolute position information from the GPS processing section 232, and when it is difficult for the GPS processing section 232 to calculate the position information, that is, when it is difficult for the GPS antenna 212 to receive GPS signals, the position information acquisition section 252 acquires current position information based on the relative position information from the position calculation section 242.

Alternatively, the position information acquisition section 252 may acquire corrected position information by performing map matching processing using the absolute position information acquired from the GPS processing section 232 and the relative position information acquired from the position calculation section 242.

The destination setting section 254 sets a destination, which is a place that the user wants to arrive at, from operation information input by the user using the input section 202, for example. The destination setting section 254 generates, for example, a screen for searching for the destination from addresses, names, telephone numbers, or genres, or a screen for selecting the destination from the registration points that are registered by the user beforehand, and causes the display section 204 to display the screen. Then, the destination setting section 254 acquires the operation information performed to the screen display by the user using the input section 202, and sets the destination.

The route search section 256 has a function of searching for a route from the current position of the PND 200a input from the position information acquisition section 252 to the destination set by the destination setting section 254.

The route guidance section 258 has a function of showing a route to a destination. In the case where the destination is set by the destination setting section 254, the route guidance section 258 notifies the user of the route to the set destination in accordance with the route acquired by the search performed by the route search section 256, using a display, audio, and the like. For example, the route guidance section 258 causes the display section 204 to display information of the route to the destination superimposed on a map. Further, in the vicinity of a place from which several roads branch off from one another, such as an intersection, the route guidance section 258 may cause the display section 204 to display an arrow or the like superimposed on the map, which indicates a route leading to the destination.

Positioning Operation using Autonomous Navigation

The positioning operation using the autonomous navigation of the navigation system 10 which has been described above will be described next with reference to FIG. 3. FIG. 3 is a sequence diagram showing operation of the navigation system according to the first embodiment.

First, the communication device 100a acquires vehicle speed information from the vehicle 300 (S102). In this case, the communication device 100a acquires the vehicle speed information by the vehicle communication section 102 via a fault diagnosis connector. Then, the communication device 100a transmits, by the navigation device-communication section 104, the acquired vehicle speed information to the PND 200a (S104).

After that, the PND 200a detects an angular velocity by the angular velocity detection sensor 216 (S106). The angular velocity detection sensor 216 inputs the detected angular velocity to the angle calculation section 244. The angle calculation section 244 calculates an angle θ of rotation of the PND 200a based on the angular velocity input from the angular velocity detection sensor 216 (S108). Note that, in FIG. 3, although the angular velocity detection processing in Step S106 and the angle calculation processing in Step S108 are performed after acquiring the vehicle speed information from the communication device 100a in Step S104, the angular velocity detection processing in Step S106 and the angle calculation processing in Step S108 may also be performed in parallel with the vehicle speed information-acquisition processing.

Then, the position calculation section 242 determines an amount of change from a position at the last calculation to a current position based on the vehicle speed information received from the communication device 100a and the angle information input from the angle calculation section 244. Then, the position calculation section 242 calculates current position information from the amount of change and the last position (S110). That is, the position information calculated here is the relative position information calculated based on the amount of change from the position at the last positioning. Note that the positioning operation using the autonomous navigation described here is continuously performed each time the communication device 100a regularly acquires the vehicle speed information.

Examples of Effects

As described above, in the navigation system 10, the communication device 100a regularly acquires the vehicle speed information from the vehicle 300, and supplies the PND 200a with the acquired vehicle speed information. Since the vehicle speed information is acquired depending on rotation of the wheel in the vehicle 300, the accuracy of the vehicle speed information is high compared to the accuracy of vehicle speed information acquired using an acceleration detection sensor, for example. The PND 200a can calculate, by using the highly accurate vehicle speed information, position information of relatively highly accurate relative position using the autonomous navigation, in the position calculation section 242. Therefore, the PND 200a can enhance the accuracy of the autonomous navigation compared to that of a PND which acquires vehicle speed information using an acceleration detection sensor of the past.

However, since the PND 200a is easily detachable, the possibility is high that an attachment positional relationship between a sensor and the vehicle 300 changes each time at the beginning of using the PND 200a. Accordingly, it is necessary that the PND 200a perform correction processing every time after activation (the same applies to the PND 800b). The correction processing is generally performed using GPS positioning information as a reference value. As described above, it requires some time after the activation until it reaches a state where it is possible to receive the GPS signal. During the time after the activation until it reaches the state where it is possible to receive the GPS signal, the fixed-navigation device 900 starts navigation using the autonomous positioning, by using the last stop position as a reference point. However, since it is necessary that the PND 200a perform correction processing of a sensor after it reaches the state where it is possible to receive the GPS signal, it is difficult to start the navigation immediately after activating the PND 200a.

Accordingly, in order to solve the above issue, the present disclosure proposes a navigation system 20 according to a second embodiment.

3. Second Embodiment

Example where Communication Device Includes Angular Velocity Detection Sensor

Figure 4:
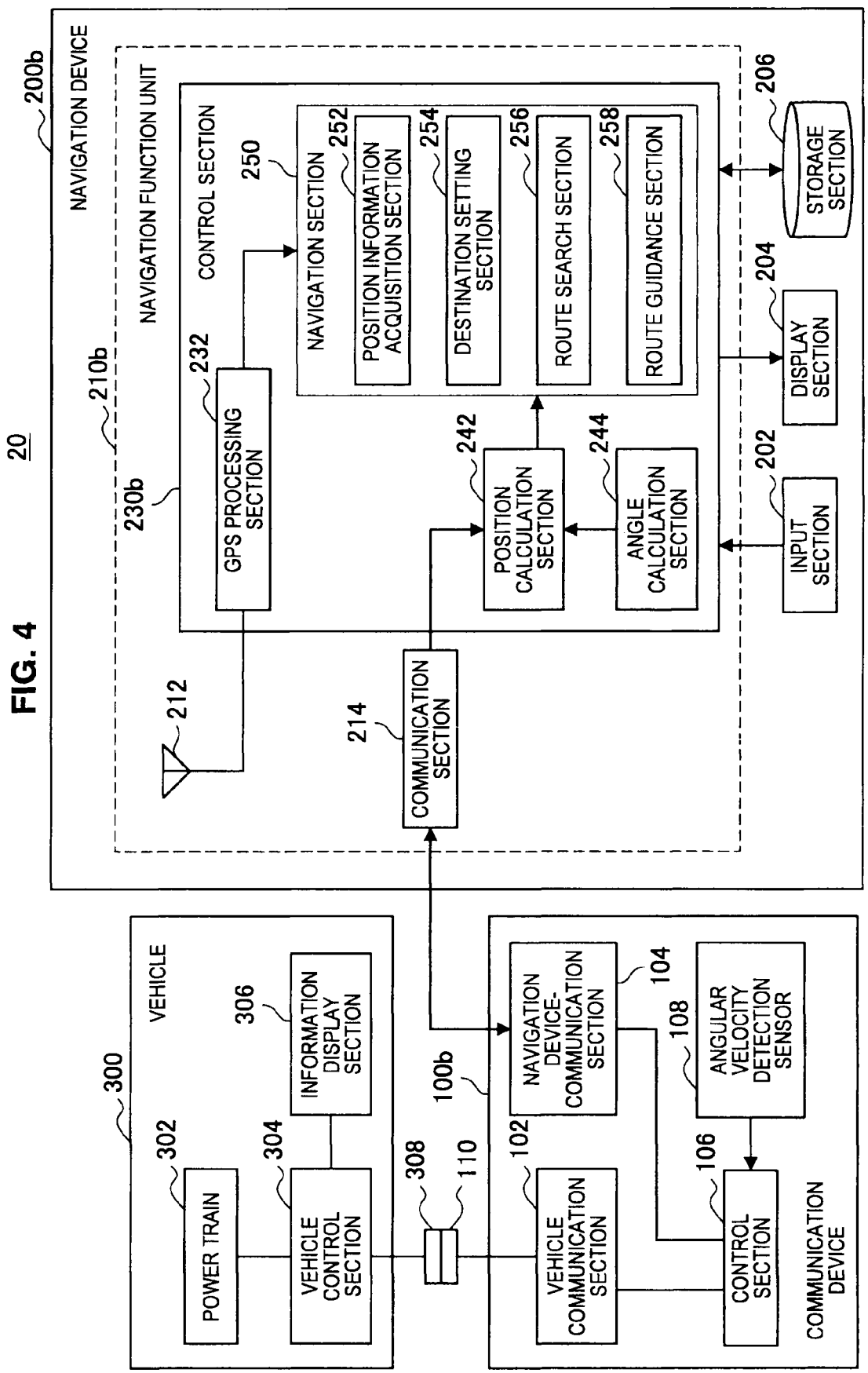
FIG. 4 is a configuration diagram of a navigation system according to a second embodiment of the present disclosure.

With reference to FIG. 4, there will be described a navigation system 20 according to a second embodiment of the present disclosure. FIG. 4 is a configuration diagram of the navigation system 20 according to the second embodiment. Note that, in the description below, the description that is the same as the first embodiment will be omitted, and the description will be made mainly on the differences.

Functional Configuration

Compared to the navigation system 10 according to the first embodiment, the navigation system 20 differs in that it is the communication device 100, not the PND 200, that includes the angular velocity detection sensor.

A control section 106 of a communication device 100b regularly acquires vehicle speed information from the vehicle 300 using a vehicle communication section 102, and also acquires information of an angular velocity from an angular velocity detection sensor 108. Then, the control section 106 causes a navigation device-communication section 104 to transmit the acquired vehicle speed information and angular velocity information to a PND 200b.

On the other hand, the PND 200b performs the positioning using the autonomous navigation based on the vehicle speed information and the angular velocity information received from the communication device 100b via a communication section 214. That is, the communication section 214 supplies a position calculation section 242 with the received vehicle speed information and supplies an angle calculation section 244 with the received angular velocity information. Then, the angle calculation section 244 calculates an angle θ of rotation of the PND 200b based on the angular velocity information detected by the angular velocity detection sensor 108 provided to the communication device 100.

The PND 200b calculates, in the position calculation section 242, relative position information based on the vehicle speed information acquired from the communication device 100b and the angular velocity acquired by the angular velocity detection sensor 108 of the communication device 100b. After that, the PND 200b shows a route to a destination based on the relative position information.

Positioning Operation using Autonomous Navigation

Figure 5:
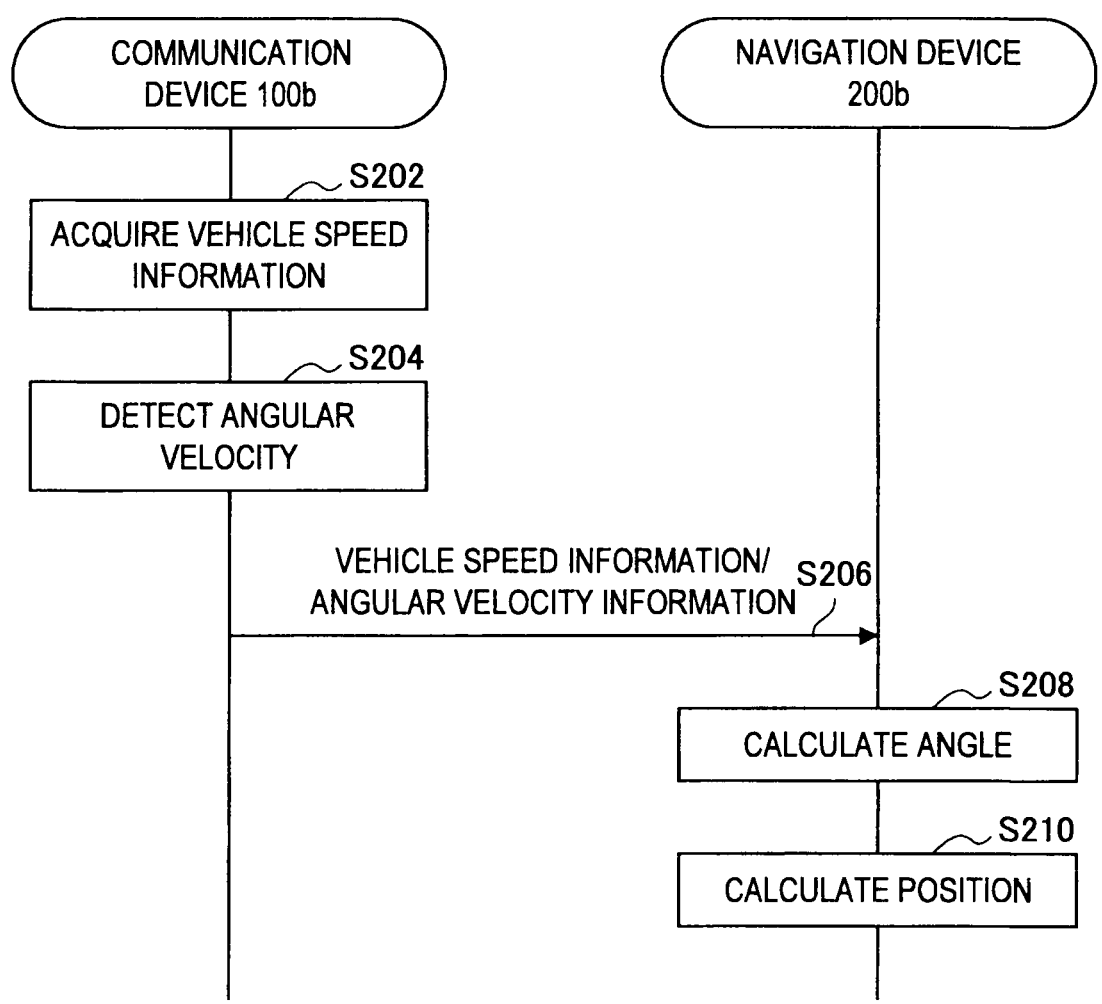
FIG. 5 is a sequence diagram showing positioning operation using autonomous navigation of the navigation system according to the second embodiment.

The positioning operation using the autonomous navigation of the navigation system 20 will be described next with reference to FIG. 5. FIG. 5 is a sequence diagram showing the positioning operation using the autonomous navigation of the navigation system 20.

First, the communication device 100b acquires vehicle speed information from the vehicle 300 (S202). With this, the communication device 100b detects an angular velocity by the angular velocity detection sensor 108 (S204). Then, the communication device 100b transmits the vehicle speed information and the angular velocity information to the PND 200b as transmission information (S206).

The PND 200b calculates an angle θ of rotation of the PND 200b based on the angular velocity information received in Step S206 (S208), and calculates the relative position information of the PND 200b based on the calculated angle θ and the vehicle speed information transmitted from the communication device 100b (S210).

Examples of Effects

As described above, in the navigation system 20, the communication device 100b regularly acquires the vehicle speed information from the vehicle 300, and supplies the PND 200b with the acquired vehicle speed information. With this, since the communication device 100b includes the angular velocity detection sensor 108, the communication device 100b acquires the angular velocity information by the angular velocity detection sensor 108, and supplies the PND 200b with the acquired angular velocity information. The PND 200b can calculate current position information based on the vehicle speed information and the angular velocity information supplied from the communication device 100b. Here, the angular velocity detection sensor 108 is provided inside the communication device 100b. In the navigation system 10 according to the first embodiment or the navigation system of the past, an angular velocity detection sensor was provided inside the PND body. Accordingly, as described above, since it was necessary to perform correction processing every time the PND body was attached, it was difficult to perform the positioning immediately after the activation.

On the other hand, in the navigation system 20, the angular velocity detection sensor 108 is provided inside the communication device 100b. As described above, the communication device 100b has a shape such that the communication device 100b body is fixed on top of a connector 308 of the vehicle 300 by engaging the connector 308 with a connector 110. Further, while the PND 200b is mainly used by being detached and carried around, it is assumed that the communication device 100b is usually used without being detached and is fixed on top of the connector 308.

Accordingly, as long as the communication device 100b is not detached and is fixed, the correction operation immediately after the activation is unnecessary. Accordingly, there can be achieved an effect that the positioning can be started immediately after activating the PND 200b, based on the position information at the time vehicle 300 stopped last time. In particular, in the case where the vehicle 300 is parked and stopped at a place where it is difficult to receive a GPS signal, such as an underground car park, and starts to move after that, there may be a case where it is difficult to use the positioning using the GPS for a while after the starting of the vehicle 300. In such a case, the configuration of the present embodiment is effective.

4. Third Embodiment

Example where Communication Device Calculates Relative Position

Figure 6:
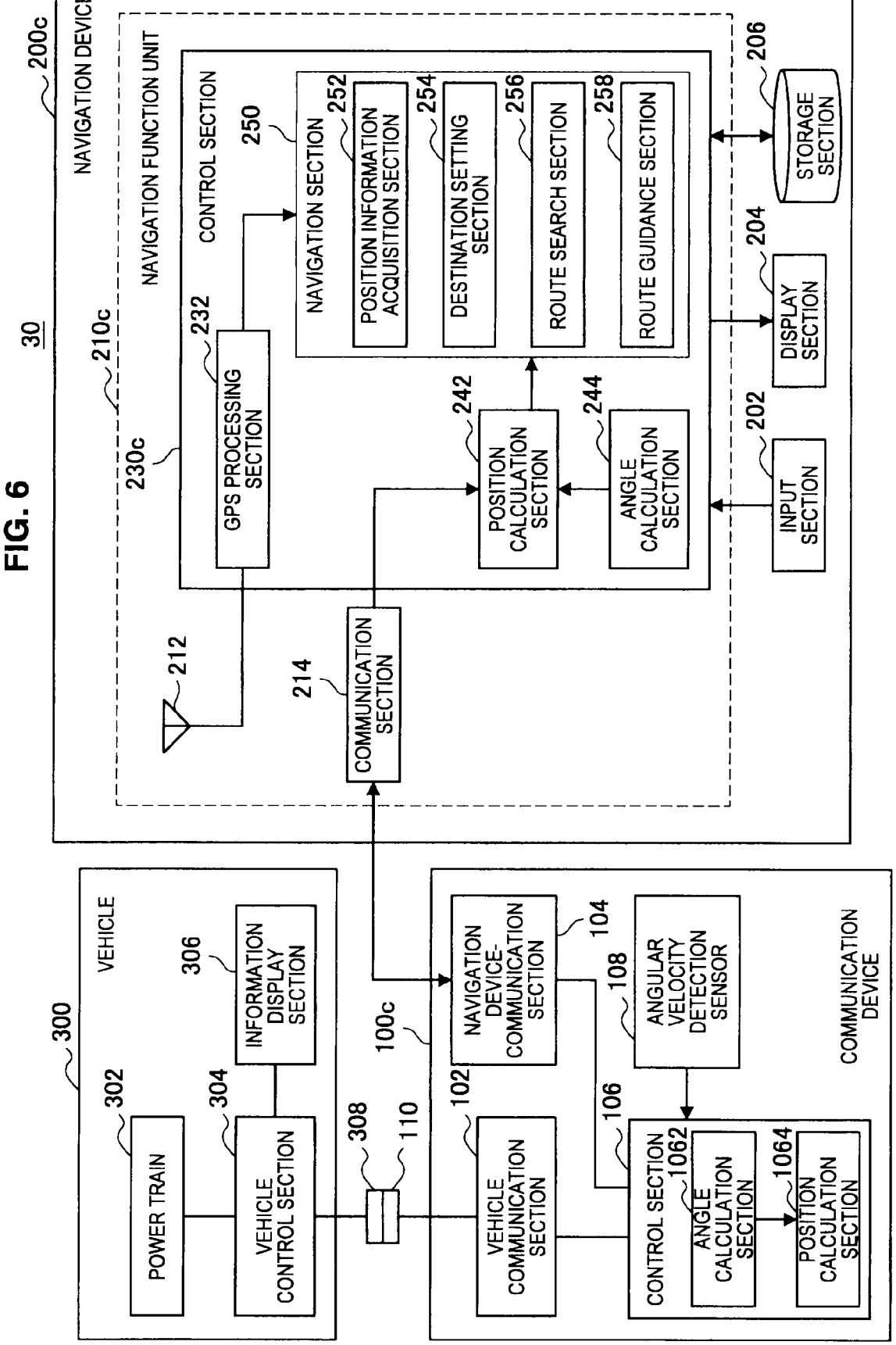
FIG. 6 is a configuration diagram of a navigation system according to a third embodiment of the present disclosure.
Figure 7:
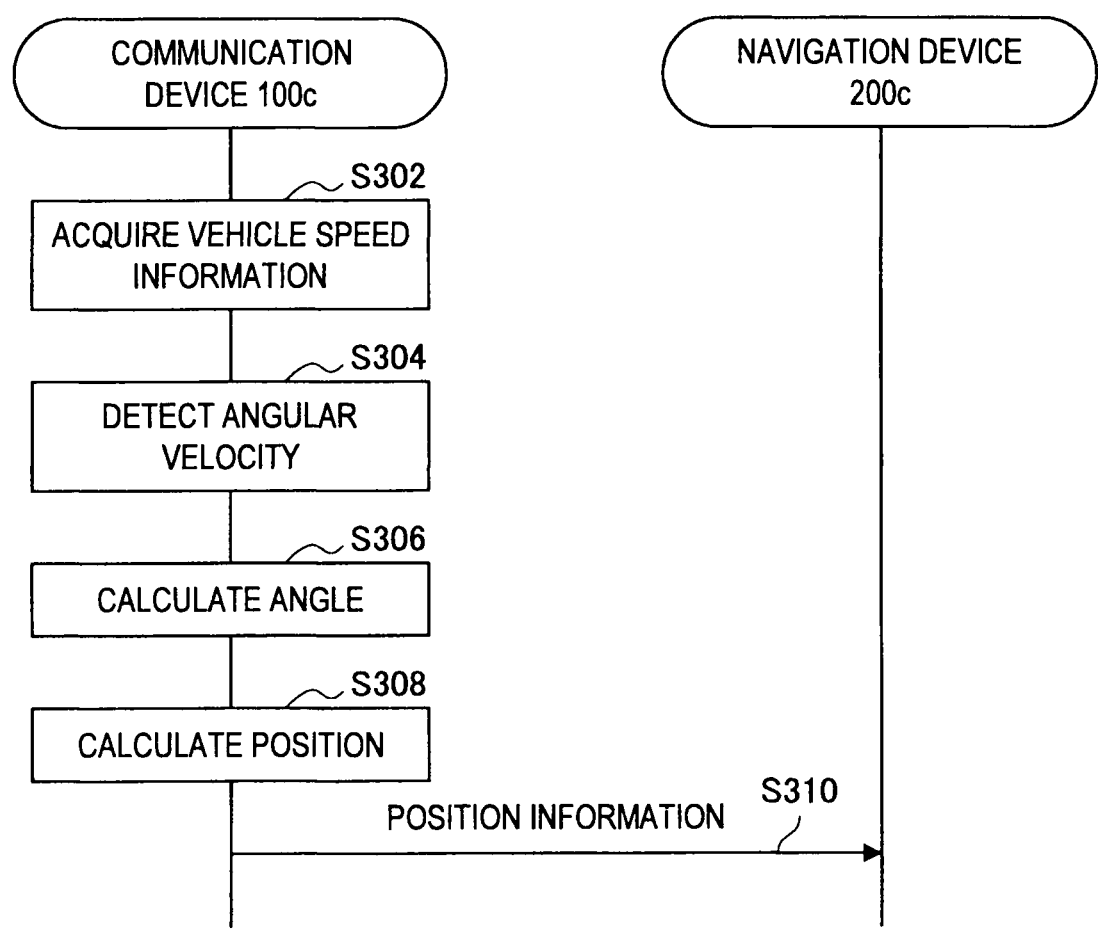
FIG. 7 is a sequence diagram showing positioning operation using autonomous navigation of the navigation system according to the third embodiment.

Here, with reference to FIGS. 6 and 7, a navigation system 30 according to a third embodiment of the present disclosure will be described. FIG. 6 is a configuration diagram of the navigation system 30 according to the third embodiment. Further, FIG. 7 is a sequence diagram showing positioning operation using the autonomous navigation of the navigation system 30.

Functional Configuration

Compared to the navigation system 20 according to the second embodiment, the navigation system 30 differs in that the communication device 100 further includes a configuration for the positioning using the autonomous navigation. That is, in addition to the angular velocity detection sensor 108, a control section 106 of a communication device 100c includes functions of an angle calculation section 1062 and a position calculation section 1064.

In the configuration of the navigation system 20 according to the second embodiment, since the correction processing immediately after activating the PND 200b is unnecessary, the PND 200b can acquire the vehicle speed information and the angle information without waiting for a time period necessary for the correction processing. However, in the case where it takes a long time to establish communication between the communication device 100b and the PND 200b, there is a possibility that it is difficult to perform accurate positioning. That is, in the case where the communication is not established at the time when the vehicle 300 starts moving, it is difficult for the PND 200b to acquire the vehicle speed information and the angular velocity information, and to perform the positioning using the autonomous navigation. In this case, the PND 200b cannot acquire position information at all until the positioning using the GPS is started.

In order to solve such an issue, in the navigation system 30 according to the present embodiment, the communication device 100c includes functions of the angle calculation section 1062 and the position calculation section 1064. With such a configuration, even in the case where it takes a long time to establish communication between the communication device 100c and a PND 200c, the communication device 100c can calculate the position information using the autonomous navigation. Accordingly, the PND 200c can acquire the position information using the autonomous navigation as soon as the communication between the communication device 100c and the PND 200c is established.

Positioning Operation using Autonomous Navigation

Referring to FIG. 7, first, the communication device 100c acquires vehicle speed information from the vehicle 300

(S302). After that, the angular velocity detection sensor 108 detects angular velocity information (S304), and the angle calculation section 1062 calculates an angle A of rotation of the PND 200c based on the detection value obtained by the angular velocity detection sensor 108 (S306). The position calculation section 1064 calculates a position of the vehicle 300 based on the vehicle speed information acquired by the vehicle communication section 102 and the angle θ calculated by the angle calculation section 1062 (S308). The communication device 100c transmits, by the navigation device-communication section 104, the relative position information calculated by the position calculation section 1064 to the PND 200c (S310).

That is, in the navigation system 30, the transmission information transmitted by the communication device 100c is the relative position information calculated by the position calculation section 1064. Note that, the communication device 100c temporarily stores, in a storage section (not shown), the position information obtained by performing the positioning last time by the position calculation section 1064. Further, as described above, in order to be able to perform the positioning immediately after the activation, it is desirable that the communication device 100c stores, in a storage section (not shown), position information obtained immediately before the vehicle 300 is stopped. In this case, when the positioning using the GPS can be performed at the stop point, the position information using the GPS may be acquired from the PND 200c.

5. Performance Comparison

With reference to FIG. 8, performances of the following will be compared to one another: the fixed-navigation device 900 of the past, the PND 800a of the past, the PND 800b of the past, the PND 200a according to the first embodiment of the present disclosure, the PND 200b according to the second embodiment of the present disclosure, and the PND 200c according to the third embodiment of the present disclosure.

The above devices are compared to one another in terms of five items, "easiness of attachment", "autonomous accuracy", "GPS disturbance suppression", "positioning continuation inside tunnel, etc.", and "positioning immediately after power is turned on".

First, "easiness of attachment" is an item showing whether or not the fixation to a vehicle, the wiring, and the like are easy. As described above, a wiring is necessary for the fixed-navigation device 900 to acquire the vehicle speed pulse signal. Consequently, the attachment of the fixed-navigation device 900 is basically performed by a person who has the special knowledge and skill of drawing out a signal wire and it is difficult to be performed by a user, and once the fixed-navigation device 900 is fixed, it is not detached when being used. Compared thereto, the PND 800 of the past can be easily attached to a dashboard via a suction cup and a cradle and easily detached from the dashboard, and can be carried around and used in a pedestrian mode. Further, it is easy to attach the PND 800 of the past which has been used in one vehicle to another vehicle and to use the PND 800 of the past in the other vehicle.

As for the PND 200, it involves additional work for the attachment, when compared to the case of the PND 800 of the past, in that it is necessary to additionally attach the communication device 100 in order to use the PND 200. However, the wiring is unnecessary, and once the communication device 100 is attached, the communication device 100 is left attached to the connector 308 of the vehicle 300, and only the PND 200 body can be detached and brought out or can be used in another vehicle.

Next, "autonomous accuracy" is an item showing the accuracy of the positioning using the autonomous navigation. The fixed-navigation device 900 acquires the vehicle speed information based on the vehicle speed pulse signal depending on rotation of the wheel in the vehicle 300. Accordingly, the fixed-navigation device 900 can maintain high autonomous accuracy compared to that of the PND 800b which acquires the vehicle speed information using the acceleration obtained by the acceleration detection sensor. Further, the PND 800a does not have the function of autonomous navigation. The PND 800b performs the positioning using the autonomous navigation by using the acceleration detection sensor, but it is difficult that the detection value obtained by the acceleration detection sensor maintains the accuracy of ground movement amount. The PND 200a, the PND 200b, and the PND 200c each use the position information based on vehicle speed information or travelling distance information acquired from the vehicle 300. The position information based on the vehicle speed information and the travelling distance information acquired from the vehicle 300 has high accuracy compared to the position information based on the detection value obtained by the acceleration detection sensor. Further, the position information based on the vehicle speed information and the travelling distance information acquired from the vehicle 300 is considered to have accuracy equal to the position information based on the vehicle speed pulse signal used in the fixed-navigation device 900.

Further, there are many cases where, in the GPS, a positioning result is largely disturbed in the case where the reception conditions of a GPS signal is not good, and the "GPS disturbance suppression" is an item showing whether or not the disturbance can be suppressed. Since the PND 800a does not have the function of the positioning using the autonomous navigation, it is difficult to suppress the disturbance of the GPS positioning result. On the other hand, the fixed-navigation device 900, the PND 800b, the PND 200a, the PND 200b, and the PND 200c each have the function of the positioning using the autonomous navigation. Therefore, in the case where the reception conditions of the GPS signal is not good, the GPS positioning result can be corrected by using the result obtained by the positioning using the autonomous navigation.

Further, "positioning continuation inside tunnel, etc." is an item showing, when the autonomous navigation is operable, whether or not the positioning is continuable for a certain length of time even in a place where it is difficult to receive a GPS signal. Since the PND 800a does not have the function of the autonomous navigation, it is difficult to continue the positioning in the place where it is difficult to receive a GPS signal. The PND 800b can continue the positioning using the function of the autonomous navigation. However, as described above, the PND 800b is inferior in autonomous accuracy compared to the fixed-navigation device 900 and the PND 200. Therefore, when errors accumulate, there is a case where it is difficult to maintain sufficient accuracy. Since the fixed-navigation device 900, the PND 200a, the PND 200b, and the PND 200c can perform the positioning using the autonomous navigation with relatively high accuracy, they can continue the positioning with a certain level of accuracy for a long period of time, compared to the PND 800b.

Further, the "positioning immediately after power is turned on" is an item showing whether or not it is possible to perform the positioning immediately after the navigation device is activated. Since the PND 800a does not have the function of the positioning using the autonomous navigation, it is difficult to perform the positioning immediately after the activation, until the positioning using the GPS is started. Further, as for the PND 800b and the PND 200a, it is necessary to correct the sensor each time the PND body is attached. Therefore, it is difficult to perform the positioning immediately after the activation.

On the other hand, as for the fixed-navigation device 900, although it is necessary to correct the sensor at the time of the attachment for the first time, it is unnecessary to perform the correction each time the fixed-navigation device 900 is activated once the fixed-navigation device 900 is attached. Further, even when the fixed-navigation device 900 moves during the time the positioning using the GPS is not possible, the fixed-navigation device 900 is capable of starting the positioning using the autonomous navigation by using the last stop position as a reference point.

Further, as for the PND 200b, the communication device 100b has the angular velocity detection sensor. Accordingly, in the same manner as the fixed-navigation device 900, it is unnecessary to perform the processing of correcting the sensor each time the PND 200b is activated. Therefore, the PND 200b can start the positioning immediately after the activation, under the condition that the communication with the communication device 100b is established before the vehicle 300 starts moving.

Further, the PND 200c acquires the position information from the communication device 100c which further has the function of the autonomous navigation. Therefore, even when the communication between the PND 200c and the communication device 100c is not established before the vehicle 300 starts moving, the positioning using the autonomous navigation is started in the communication device 100c.

6. Modified Example

Further, the navigation devices according to the first to third embodiments of the present disclosure can also be implemented as a mobile phone. That is, the transmission information from the communication device 100 may be received by the mobile phone, and the navigation based on the transmission information may be performed.

Figure 9:
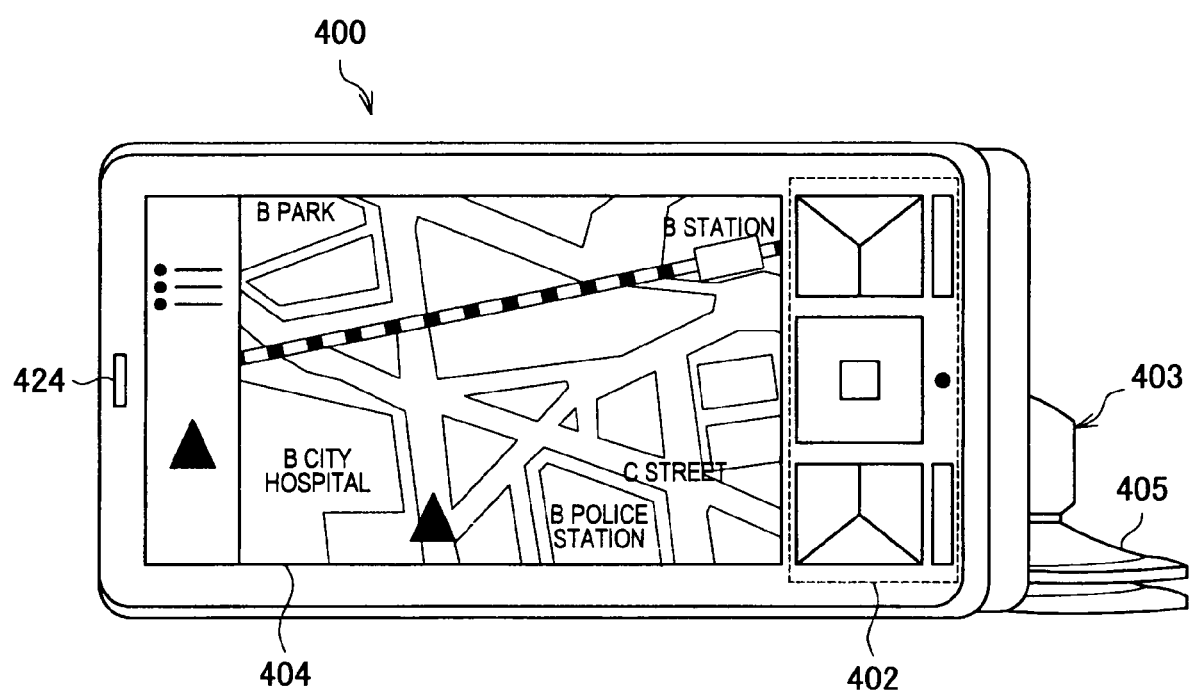
FIG. 9 is an appearance example of a case where the navigation device according to the first to third embodiments represents a mobile phone.

A mobile phone 400, which represents a navigation device in this case, has an external appearance as shown in FIG. 9, for example. That is, it is possible to cause the mobile phone 400 to function as the navigation device, by holding the mobile phone 400 by a cradle 403 on a dashboard of the vehicle 300 via a suction cup 405.

Figure 10:
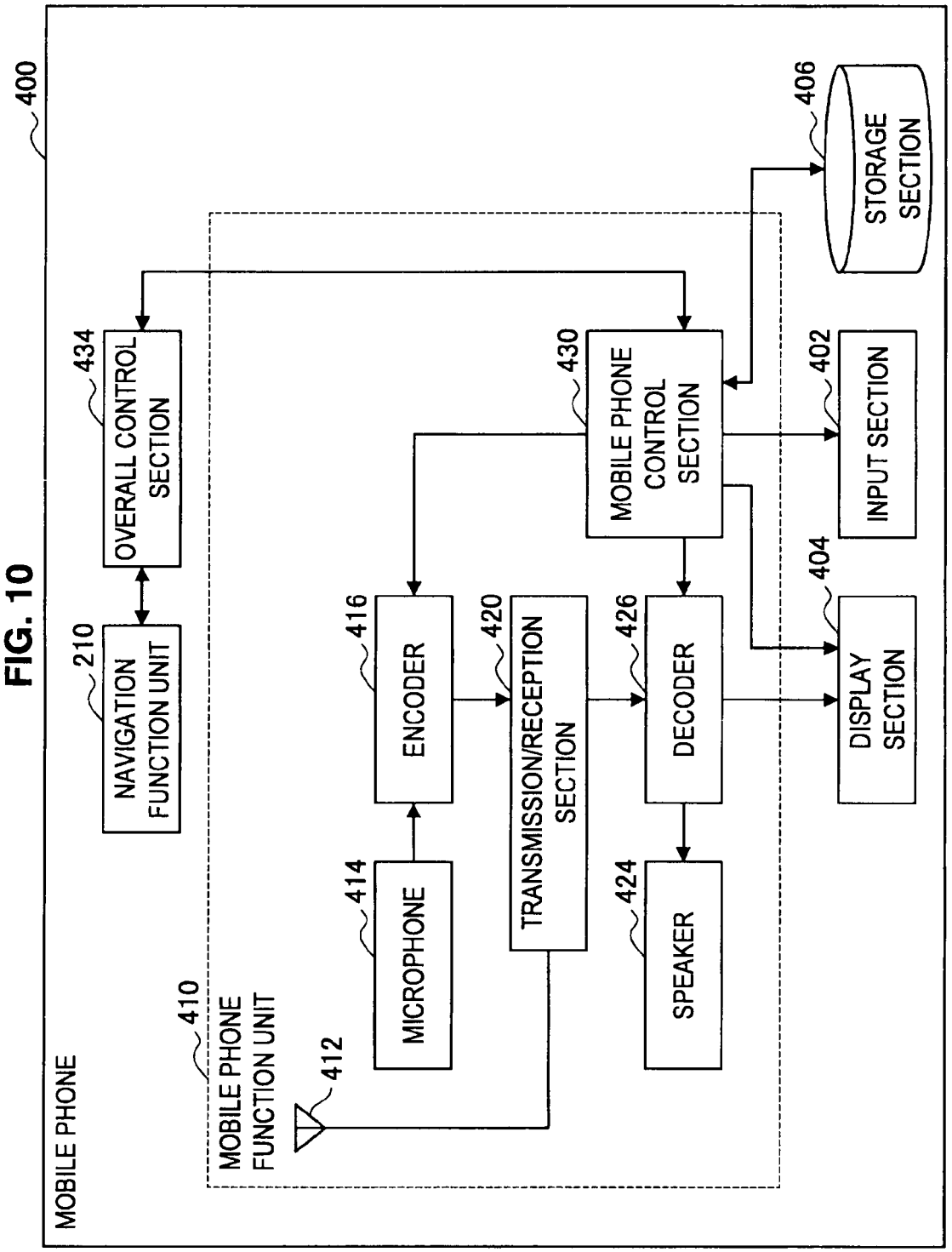
FIG. 10 is a configuration diagram of a case where the navigation device according to the first to third embodiments represents the mobile phone.

With reference to FIG. 10, a functional configuration of the mobile phone 400 will be described. The mobile phone 400 includes a navigation function unit 210, a display section 404, an input section 402, a storage section 406, a mobile phone function unit 410, and an overall control section 434.

The mobile phone function unit 410 is connected to the display section 404, the input section 402, and the storage section 406. In fact, although it is simplified in the drawing of FIG. 10, the display section 404, the input section 402, and the storage section 406 are also each connected to the navigation function unit 210. Note that, since the detailed configuration of the navigation function unit 210 has been specifically described in FIGS. 1, 4, and 6, the description thereof will be omitted here.

The mobile phone function unit 410 has a configuration for realizing a communication function and an e-mail function, and includes a communication antenna 412, a microphone 414, an encoder 416, a transmission/reception section 420, a speaker 424, a decoder 426, and a mobile phone control section 430.

The microphone 414 collects sound and outputs the sound as an audio signal. The encoder 416 performs digital conversion and encoding of the audio signal input from the microphone 414 in accordance with the control of the mobile phone control section 430, and outputs audio data to the transmission/reception section 420.

The transmission/reception section 420 modulates the audio data input from the encoder 416 in accordance with a predetermined system, and transmits the modulated audio data to a base station of the mobile phone 400 from the communication antenna 412 via radio waves. Further, the transmission/reception section 420 demodulates a radio signal received by the communication antenna 412 and acquires audio data, and outputs the audio data to the decoder 426.

The decoder 426 performs decoding and analog conversion of the audio data input from the transmission/reception section 420 in accordance with the control of the mobile phone control section 430, and outputs an audio signal to the speaker 424. The speaker 424 outputs the audio based on the audio signal supplied from the decoder 426.

Further, in the case of receiving an e-mail, the mobile phone control section 430 supplies the decoder 426 with received data from the transmission/reception section 420, and causes the decoder 426 to decode the received data. Then, the mobile phone control section 430 outputs e-mail data obtained by the decoding to the display section 404 and causes the display section 404 to display the e-mail data, and also records the e-mail data in the storage section 406.

Further, in the case of transmitting an e-mail, the mobile phone control section 430 causes the encoder 416 to encode the e-mail data which is input via the input section 402, and transmits the encoded e-mail data via radio waves through the transmission/reception section 420 and the communication antenna 412.

The overall control section 434 controls the mobile phone function unit 410 and the navigation function unit 210. For example, in the case of receiving a phone call while the navigation function unit 210 is executing a navigation function, the overall control section 434 may temporarily switch its function from the navigation to a verbal communication carried out by the mobile phone function unit 410, and, when the call ends, may cause the navigation function unit 210 to restart the navigation function.

In recent years, there has appeared a mobile phone that can be used as a car navigation device, and when the communication device 100 according to the embodiments of the present disclosure is used, there can be realized a function equivalent to that of the fixed type navigation system of the past also by using the mobile phone. In this case, when the communication device 100c described in the third embodiment and the mobile phone is used in combination, for example, it is preferred because the mobile phone is only to have a communication function for receiving a result obtained by the positioning using the autonomous navigation from the communication device 100.

The navigation device using the mobile phone is particularly preferred in the case of providing information which is customized for an individual user. Even in the case where the vehicle itself is shared between two or more people, there can be provided individualized information. For example, in the case where there is private information such as a history of destinations, it is free from worry about the private information being seen by another person when it is recorded in the mobile phone, and the information can be further used in another vehicle. In this case, the communication device 100c has a function of enhancing positioning accuracy of the navigation device using the mobile phone in the case of being used on the vehicle. Therefore, the navigation device using the mobile phone can use highly accurate positioning information with a communication function only.

It should be understood by those skilled in the art that various modifications, combinations, sub-combinations and alterations may occur depending on design requirements and other factors insofar as they are within the scope of the appended claims or the equivalents thereof.

For example, in the embodiments above, although the navigation device is the PND or the mobile phone, the present disclosure is not limited thereto. Other devices each having a navigation function are within the scope of the present disclosure.

Further, in the embodiments above, although there is described, as a method of calculating the travelling azimuth used for the autonomous navigation, the method of calculating the travelling azimuth from information of the detected angular velocity, the present disclosure is not limited thereto. For example, there may be considered a method of directly detecting a travelling azimuth, in place of the angular velocity, by using a geomagnetic sensor, for example.

Note that in the present specification, the steps written in the sequence diagrams may of course be processed in chronological order in accordance with the stated order, but may not necessarily be processed in the chronological order, and may be processed individually or in a parallel manner. It is needless to say that, in the case of the steps are processed in the chronological order, the order of the steps may be changed appropriately according to circumstances.

The present disclosure contains subject matter related to that disclosed in Japanese Priority Patent Application JP 2010-153906 filed in the Japan Patent Office on Jul. 6, 2010, the entire content of which is hereby incorporated by reference.

What is claimed is:

1. A positioning method of a positioning system which includes a communication device that is provided inside a vehicle by a connector being engaged with a connector provided to the vehicle and that includes a vehicle communication section and an information processing device-communication section, a first position calculating section, and which includes an information processing device that includes a communication section configured to communicate with the information processing device-communication section and a second position calculation section configured to calculate a current position, the positioning method comprising:
receiving, by the vehicle communication section, vehicle speed information or travelling distance information of the vehicle from the vehicle via the connector;
calculating, by the first position calculating section, the current position based on an angular velocity acquired by an angular velocity detection sensor and the vehicle speed information or the travelling distance information when the information processing device is unable to acquire positioning signals and unable to receive communications from the communication device;
transmitting, by the information processing device-communication section, transmission information including one of: the current position, when first position calculating section has calculated the current position and communications are receivable from the communication device and the vehicle speed information or the travelling distance information acquired by the vehicle communication section, to the information processing device;
receiving, by the communication section, the transmission information; and
calculating, by the second position calculation section, the current position based on the vehicle speed information or the travelling distance information when the transmission information does not include the current position.

2. A communication device comprising:
a connector configured to engage with a connector provided to a vehicle;
a vehicle communication section configured to receive vehicle speed information or travelling distance information of the vehicle from the vehicle via the connector;
an angular velocity detection sensor configured to acquire an angular velocity of the vehicle;
a first position calculating section that calculates a current position based on the angular velocity acquired by the angular velocity detection sensor and the vehicle speed information or the travelling distance information, when an information processing device is unable to acquire positioning signals and unable to receive communications from the communication device; and
an information processing device-communication section configured to transmit, to the information processing device, transmission information including one of: the current position, when first position calculating section has calculated the current position and communications are receivable from the communication device and the vehicle speed information or the travelling distance information acquired by the vehicle communication section.

3. The communication device according to claim 2, wherein the information processing device-communication section transmits, as the transmission information to the information processing device, the angular velocity acquired by the angular velocity detection sensor, when the transmission includes the vehicle speed information or the travelling distance information.

4. The communication device according to claim 2, wherein the information processing device-communication section communicates wirelessly with the information processing device in accordance with a short range wireless communication standard.

5. A positioning system comprising:
a communication device which includes
a connector configured to engage with a connector provided to a vehicle,
an angular velocity detection sensor configured to acquire an angular velocity of the vehicle,
a first position calculating section that calculates a current position based on the angular velocity acquired by the angular velocity detection sensor and the vehicle speed information or the travelling distance information, when an information processing device is unable to acquire positioning signals and unable to receive communications from the communication device;
a vehicle communication section configured to receive the vehicle speed information or travelling distance information of the vehicle from the vehicle via the connector, and
an information processing device-communication section configured to transmit, to the information processing device, transmission information including one of: the current position, when first position calculating section has calculated the current position and communications are receivable from the communication device and the vehicle speed information or the travelling distance information acquired by the vehicle communication section; and the information processing device which includes
- a communication section configured to receive the transmission information from the communication device, and
- a second position calculation section configured to calculate the current position based on the vehicle speed information or the travelling distance information, when the transmission information does not include the current position.

6. The positioning system according to claim 5,
wherein the information processing device further includes a navigation section configured to show a route to a destination using the calculated position information.

7. The positioning system according to claim 5,
wherein the connector provided to the vehicle is a connector for fault diagnosis.

8. The positioning system according to claim 7,
wherein the information processing device-communication section transmits, as the transmission information to the information processing device, the angular velocity acquired by the angular velocity detection sensor, when the transmission information includes the vehicle speed information or the travelling distance information.

9. The positioning system according to claim 5,
wherein the communication device has a shape such that the connector is fixed on the connector provided to the vehicle when the connector engages with the connector provided to the vehicle.

* * * * *